United States Patent
Mason et al.

(10) Patent No.: US 9,317,488 B2
(45) Date of Patent: *Apr. 19, 2016

(54) METHOD AND SYSTEM FOR OPTIMALLY TRANSCODING WEBSITES

(71) Applicants: Christopher Mason, Pittsburgh, PA (US); Nitin Mittal, Pittsburgh, PA (US); Christina Koshzow, Pittsburgh, PA (US); Schuyler Evar Eckstrom, Pittsburgh, PA (US); Sebastian Dovenor, Pittsburgh, PA (US); Daniel Scott Fitzpatrick, Pittsburgh, PA (US)

(72) Inventors: Christopher Mason, Pittsburgh, PA (US); Nitin Mittal, Pittsburgh, PA (US); Christina Koshzow, Pittsburgh, PA (US); Schuyler Evar Eckstrom, Pittsburgh, PA (US); Sebastian Dovenor, Pittsburgh, PA (US); Daniel Scott Fitzpatrick, Pittsburgh, PA (US)

(73) Assignee: BRANDING BRAND, INC., Pittsburgh, PA (US)

(*) Notice: Subject to any disclaimer, the term of this patent is extended or adjusted under 35 U.S.C. 154(b) by 582 days.

This patent is subject to a terminal disclaimer.

(21) Appl. No.: 13/685,881

(22) Filed: Nov. 27, 2012

(65) Prior Publication Data
US 2013/0238983 A1    Sep. 12, 2013

Related U.S. Application Data

(63) Continuation of application No. 13/417,407, filed on Mar. 12, 2012, now Pat. No. 8,341,516.

(51) Int. Cl.
*G06F 17/22* (2006.01)
*G06F 17/30* (2006.01)

(52) U.S. Cl.
CPC ...... *G06F 17/2247* (2013.01); *G06F 17/30899* (2013.01)

(58) Field of Classification Search
CPC ..... G06F 17/22; G06F 17/2247; G06F 17/30; G06F 17/30899
USPC .................................. 715/238, 239
See application file for complete search history.

(56) References Cited

U.S. PATENT DOCUMENTS

| | | | |
|---|---|---|---|
| 6,327,628 B1 | 12/2001 | Anuff et al. | |
| 6,341,316 B1 | 1/2002 | Kloba et al. | |
| 6,704,798 B1 | 3/2004 | Mogul | |
| 7,574,486 B1 | 8/2009 | Cheng et al. | |
| 7,581,173 B1 * | 8/2009 | Ferguson et al. | 715/235 |
| 2002/0016801 A1 | 2/2002 | Reiley et al. | |
| 2002/0123334 A1 | 9/2002 | Borger et al. | |
| 2003/0115365 A1 | 6/2003 | Lindsey | |
| 2006/0161635 A1 | 7/2006 | Lamkin et al. | |
| 2007/0208686 A1 | 9/2007 | Gupta et al. | |
| 2008/0016462 A1 | 1/2008 | Wyler et al. | |
| 2009/0044098 A1 | 2/2009 | Wyler et al. | |
| 2009/0063530 A1 | 3/2009 | Lee et al. | |

(Continued)

OTHER PUBLICATIONS

Microsoft Computer Dictionary; May 1, 2002; Microsoft Press; Fifth Edition; pp. 697 and 699.*

(Continued)

*Primary Examiner* — Andrew Dyer
(74) *Attorney, Agent, or Firm* — Maier & Maier, PLLC

(57) ABSTRACT

Computer systems and computer-implemented methods for transcoding websites adapted for viewing on a personal computer to websites adapted for viewing on a mobile device are disclosed. A computer-implemented transcoding method is implemented on a website server. The computer-implemented transcoding method includes handling a request, selecting a controller, generating a response, and returning the response.

18 Claims, 5 Drawing Sheets

(56) References Cited

U.S. PATENT DOCUMENTS

| | | |
|---|---|---|
| 2009/0210514 A1 | 8/2009 | Davis et al. |
| 2009/0222721 A1 | 9/2009 | Parkinson |
| 2010/0017502 A1 | 1/2010 | Cheng et al. |
| 2010/0199197 A1 | 8/2010 | Faletski et al. |
| 2010/0262780 A1 | 10/2010 | Mahan et al. |
| 2010/0274870 A1 | 10/2010 | Cremin et al. |
| 2011/0072106 A1 | 3/2011 | Hoffert et al. |
| 2011/0307776 A1 | 12/2011 | Cremin |

OTHER PUBLICATIONS

Whatsa Controller Anyway; Sep. 3, 2011; c2.com; pp. 1-5.*

Virginia Montecino; HTML Tags; 1996; George Mason University; pp. 1-4.

International Search Report and Written Opinion dated Jun. 2, 2013, as filed in International Patent Application No. PCT/US2013/025725, filed Feb. 12, 2013, (15 pages).

* cited by examiner

METHOD AND SYSTEM FOR OPTIMALLY TRANSCODING WEBSITES

CROSS-REFERENCE TO RELATED APPLICATION

This patent application is a continuation application of U.S. patent application Ser. No. 13/417,407, filed Mar. 12, 2012, herein incorporated by reference in its entirety.

BACKGROUND

A personal computer may allow a user to view rich and diverse web content to be in various formats on a computer monitor, and to be interact with websites using a full keyboard and mouse. However, the small size of most mobile device monitors, as well as the limited input methods, restrict mobile users to a confined web-browsing experience. Moreover, some content viewable on a personal computer may not be compatible with or viewable on most mobile devices. In order to provide mobile users with an enjoyable web-browsing experience, transcoding can allow mobile device users to view websites normally adapted for viewing on a personal computer.

However, conventional transcoding methods are inefficient, often involving redundant steps and requiring unnecessary processing time. Furthermore, most conventional transcoding methods are ill-adapted to deal with the wide variety of content and data found on websites, and often use a one-method-fits-all approach where adapted mechanisms may be needed.

SUMMARY

An exemplary embodiment of a computer-implemented transcoding method may be implemented on a website server. The transcoding method may include handling a request, selecting a controller, generating a response, and returning the response. Additionally, in some exemplary embodiments, a server may be utilized to handle a request, select a controller, generate a response, and return the response.

BRIEF DESCRIPTION OF THE FIGURES

The present embodiments are illustrated by way of example and not limitation in the figures of the accompanying drawings, in which like references indicate similar elements and in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, a discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Embodiments disclosed herein may describe methods and systems for transcoding websites adapted for viewing on a personal computer to websites adapted for viewing on a mobile device. The transcoding systems may include a transcoder on a website server, configured for rapid transcoding of websites into formats optimized for mobile devices.

The transcoding systems may further be adapted to perform transcoding in real-time. In response to a request from a mobile device's web browser, a transcoding system may request the corresponding web server to provide data pertaining to the website. Data provided by the web server may be then transcoded into a mobile-device format by the transcoder and the transcoded version of the website may be output to the mobile device.

The transcoding systems may be further adapted to transcode mobile commerce sites by combining a website's static and dynamic elements. The static elements may be website elements that are constant from page to page and that have been developed for a particular website. The dynamic elements may be a feed provided by the website that includes frequently-updated information that is displayed in conjunction with the static elements on the mobile device.

Figure 1:
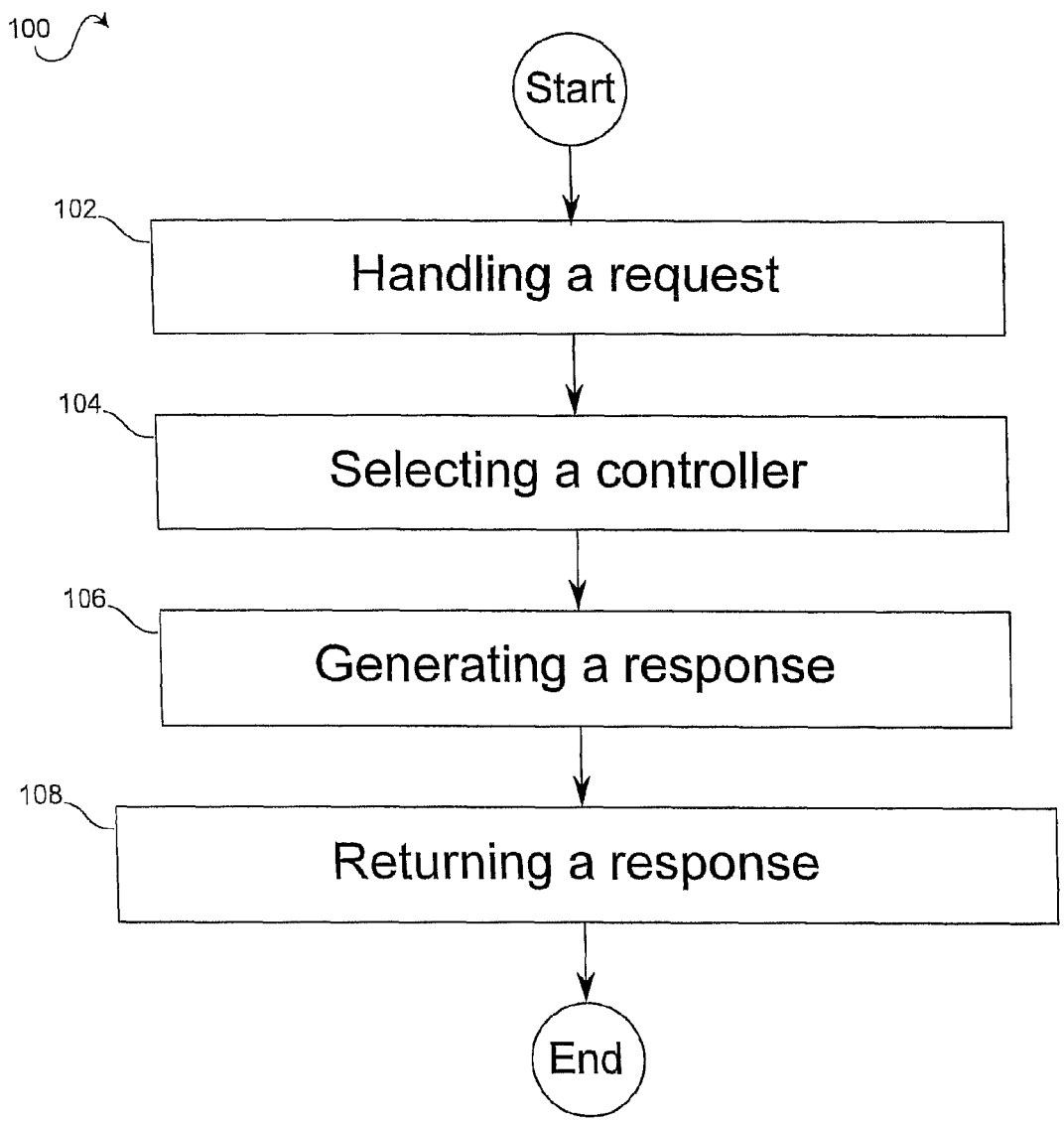
FIG. 1 illustrates an exemplary embodiment of a computer-implemented method of transcoding websites.

FIG. 1 shows an exemplary embodiment 100 of a computer-implemented method of transcoding websites. The method may be implemented on a website server. The method of transcoding websites may include handling a request, selecting a controller, generating a response, and returning the response. At step 102 of the method, the website server may handle a request to a transcoded webpage. At step 104 of the method, the transcoder may select a controller for generating the response. At step 106 of the method, the transcoder may generate a response using the controller. At step 108 of the method, the transcoder may return the response. Prior to returning the response, the response may be optimized and/or cached.

Figure 2:
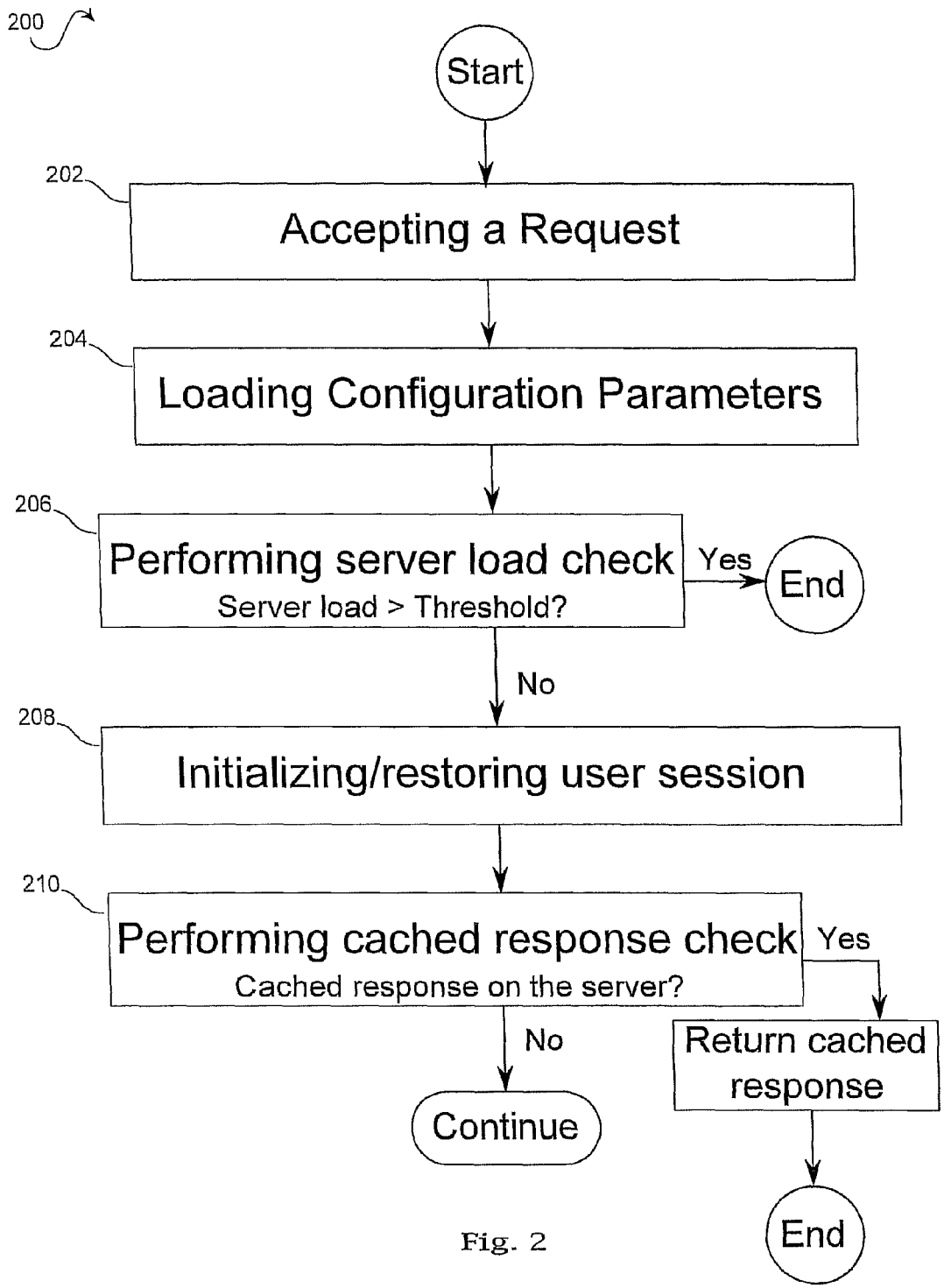
FIG. 2 illustrates an exemplary embodiment of a method of handling a request.

FIG. 2 shows an exemplary embodiment 200 of a method of handling a request to a transcoded webpage.

At step 202 of the method of handling a request, the server may accept a request to a transcoded webpage. The request may be in the form of a Uniform Resource Locator (hereinafter "URL"), or any other request format known in the art. The URL may be in a format typically associated with mobile websites, or in any other URL format known in the art.

At step 204 of the method of handling a request, a set of configuration parameters is selected and loaded. The configuration parameters may include a choice of modules to be used for the transcoding. The configuration parameters may be defined in a client-facing or administrator-facing dashboard, in an application's global configuration, in an individual "controller" file, via query parameters appended to a URL, via a static JSON configuration file residing on the application server, or in any other manner known in the art. The selection of configuration parameters may be done on the server. Configuration parameter selection may depend on a URL from which an application was accessed, on an application environment type—such as development, staging or production—or on any other configuration parameter selection means known in the art. Each configuration parameter may include a permission setting specifying whether it is able to be over-ridden by dynamic configuration definition.

At step 206 of the method of handling a request, a server load check may be performed on the server. If the server load is greater than a preset or otherwise set threshold, the server may redirect to a non-transcoded webpage as a response, and the method may terminate. Using a threshold value may avoid a system failure and may increase the efficiency of the process. If the server load is not greater than a preset or otherwise set threshold, the transcoding may continue.

At step 208 of the method of handling a request, a user session may be initialized or restored.

At step 210, a cached response check may be performed. If a cached response is found on the server, the server may return the cached response, and the method may terminate. If no cached response is found on the server, the transcoding may continue.

Figure 3:
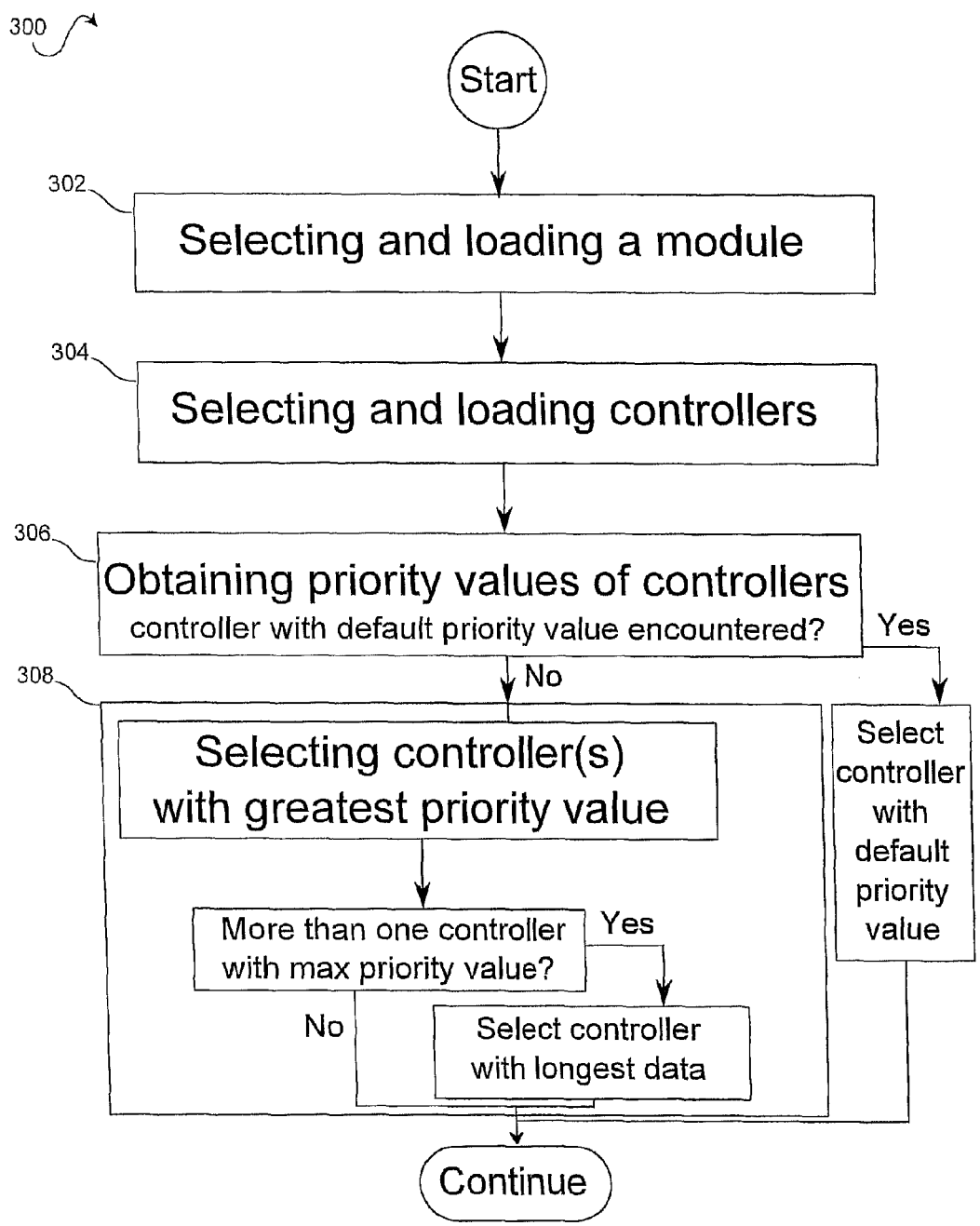
FIG. 3 illustrates an exemplary embodiment of a method of selecting a controller.

FIG. 3 shows an exemplary embodiment 300 of a method of selecting a controller for generating the response.

At step 302 of the method of selecting a controller, modules may be selected and loaded on the server according to configuration parameters.

At step 304 of the method of selecting a controller, controllers associated with the modules may be selected and loaded on the server.

At step 306 of the method of selecting a controller, a priority value may be obtained for each controller. Each controller may be associated with a set of triggers. The triggers may assist in determining the suitability of each controller for transcoding the desired webpage. As a result, the controller best adapted for dealing with the web content to be transcoded may be selected.

Each trigger may include a type, data, and a priority. The type of a trigger may define an algorithm to evaluate the data, such as, for example, a full matching algorithm, a partial matching algorithm, a matching algorithm using a grep function, or any other algorithm known in the art. A trigger may output a priority value or a false value. Non-transcoded data may be looped through the set of triggers. If the trigger outputs a priority value, the priority value and data of the trigger may become associated with the controller.

If a controller priority value matches a preset or otherwise set default priority, the controller may be selected, and the method of selecting a controller may terminate. Using a default priority value may increase the efficiency of the process. Otherwise, the method may continue.

At step 308 of the method of selecting a controller, the controller associated with the greatest priority value is selected. If two controllers associated with the greatest priority value are associated with equal priorities, the controller associated with the longest data is selected.

Figure 4:
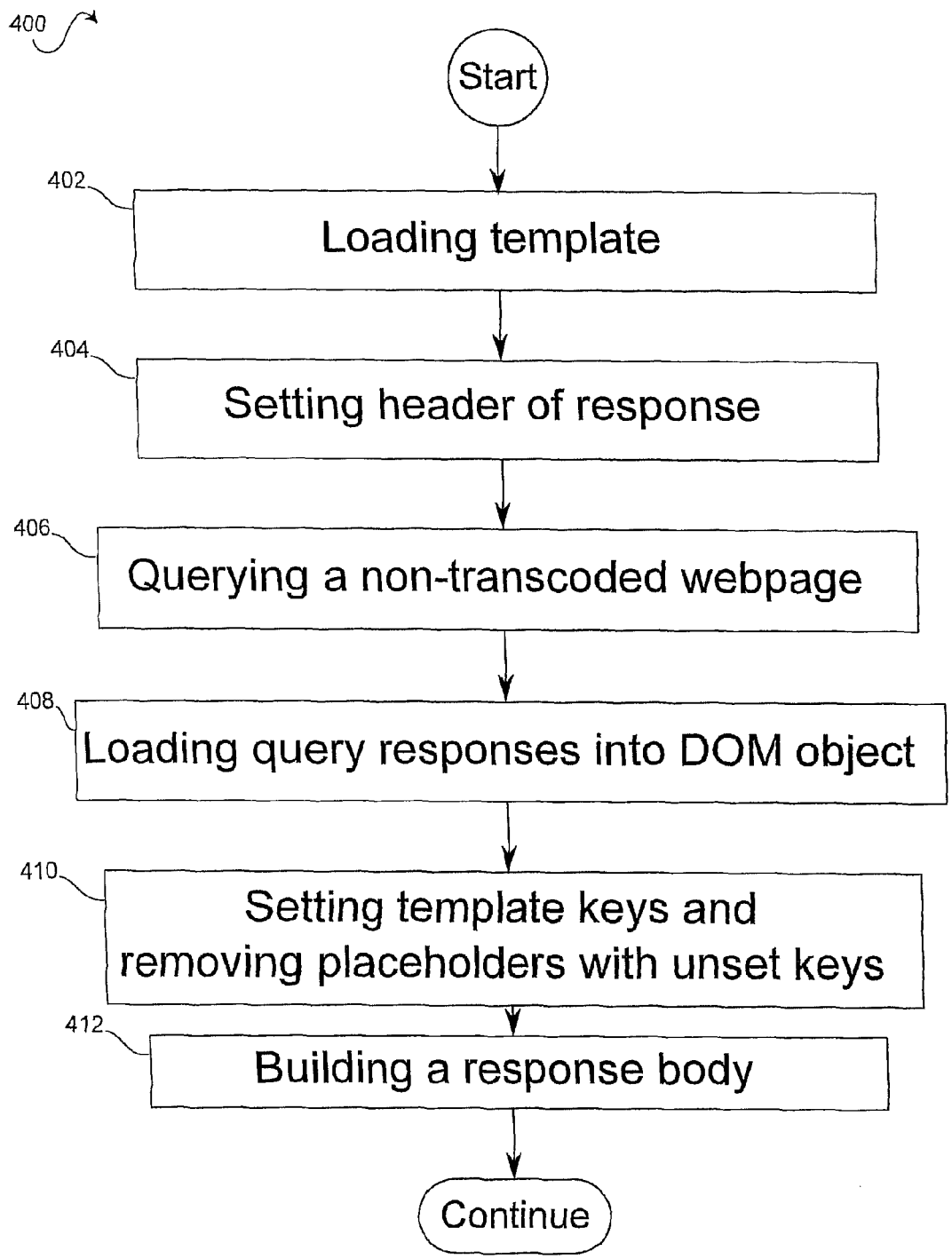
FIG. 4 illustrates an exemplary embodiment of a method of generating a response.

FIG. 4 shows an exemplary embodiment 400 of a method of generating a response. The response may be generated using the selected controller. The response may include a header and a body.

At step 402 of the method of generating a response, a template associated with the controller may be loaded. Each template may contain a set of placeholders associated with keys. Keys may be data variables associated with placeholders on the template.

At step 404 of the method of generating a response, the response header may be set. The header may be a HyperText Markup Language (hereinafter "HTML") header, an Extensible Markup Language (hereinafter "XML") header, an image header, or a header of any web-compatible format known in the art.

At step 406 of the method of generating a response, a non-transcoded webpage may be queried.

At step 408 of the method of generating a response, responses to queries to the non-transcoded webpage may be loaded into a Document Object Model (hereinafter "DOM") object.

At step 410 of the method of generating a response, keys may be set according to the DOM object. If a key is not set, its associated placeholder may be removed from the template.

At step 412 of the method of generating a response, the response body may be built according to the set keys and the template. The body may include HTML content, XML content, image content, JAVASCRIPT content, CSS content, or any other web-compatible content known in the art.

Figure 5:
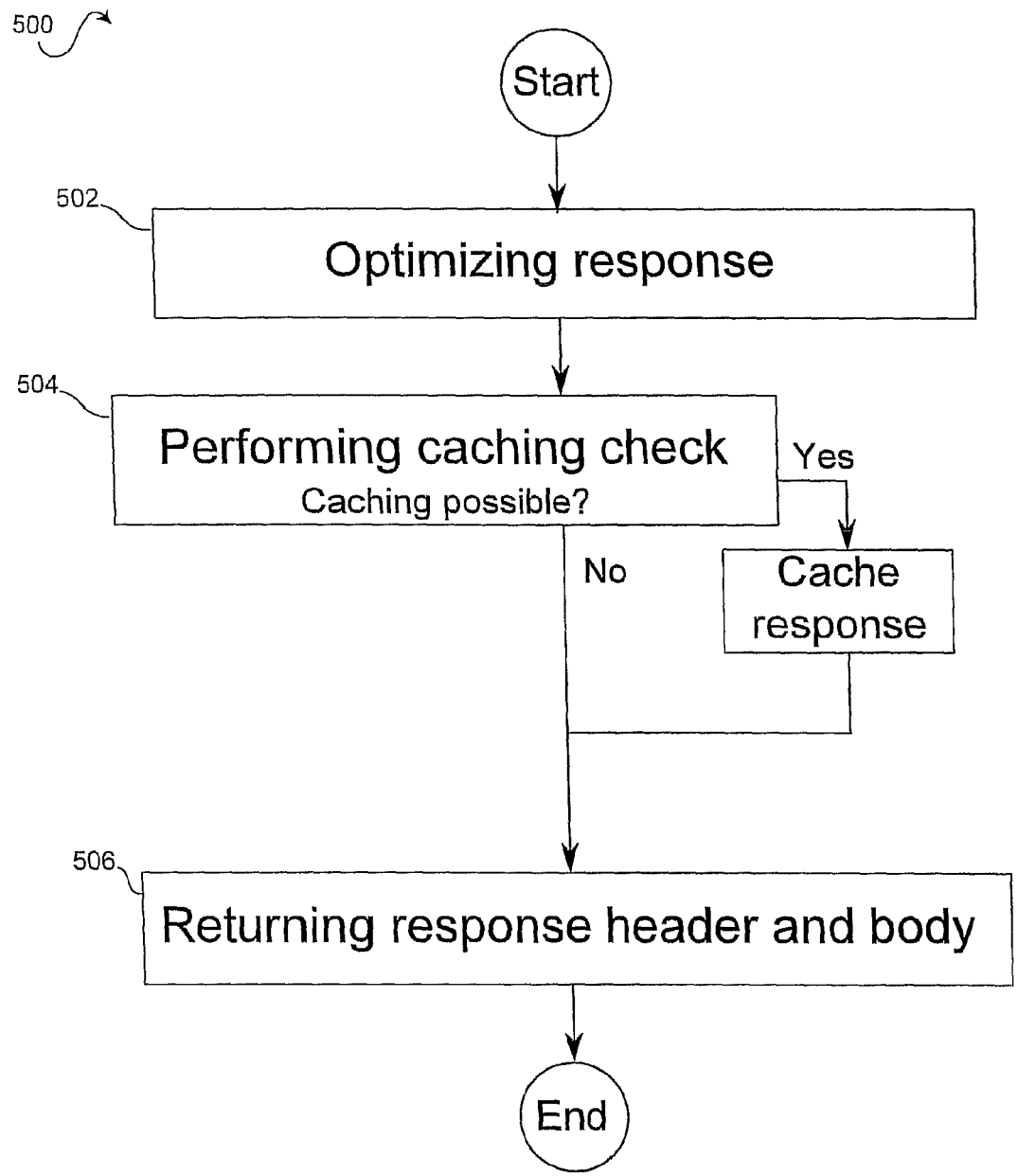
FIG. 5 illustrates an exemplary embodiment of a method of returning the response.

FIG. 5 shows an exemplary embodiment 400 of a method of returning a response.

At step 502 of the method of returning a response, an optimization check may be performed on the server. Global configuration settings may determine whether responses should be optimized by default. Each controller may override these global configuration settings to enable or disable optimization. If optimization is due, the response may be optimized by optimizing eventual JAVASCRIPT and CSS code, modifying URLs to point to the desired webpages—such as, for example, the transcoded webpages—and removing white space.

At step 504 of the method of returning a response, a caching test may be performed on the server. If caching is possible, the response may be cached. Caching may allow for efficient resource allocation when accessing the same webpage in the future.

At step 506 of the method of returning a response, the response may be returned. For example, the header and the body of the response may be returned.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer-implemented method of selecting an optimal controller for transcoding, comprising:
   selecting and loading at least one module according to at least one configuration parameter;
   selecting and loading a plurality of controllers associated with the at least one module;
   obtaining a plurality of controller priority values and a plurality of controller data strings, wherein each of the plurality of controller priority values is associated with one of the plurality of controllers, and wherein each of the plurality of controller data strings is associated with one of the plurality of controllers;
   selecting one of the plurality of controllers as the optimal controller, such that:
   the priority value associated with the optimal controller is greater than or equal to the priority value associated with each of the other controllers; and wherein selecting one of the plurality of controllers as the optimal controller is selected such that the data string associated with the optimal controller is one of: (1) longer than and (2) longer than or equal in length to each of the data strings associated with each of the other controllers associated with a priority value equal to the priority value associated with the optimal controller.

2. The computer-implemented method of selecting an optimal controller for transcoding of claim 1,
wherein the optimal controller is one of the plurality of controllers,
wherein the priority value associated with the optimal controller matches a default priority value.

3. The computer-implemented method of selecting an optimal controller for transcoding of claim 1, wherein obtaining a plurality of controller priority values and a plurality of controller data strings comprises:
defining at least one trigger associated with each of the plurality of controllers,
looping non-transcoded data through the at least one trigger,
associating a priority value output by the at least one trigger with the each of the plurality of controllers, and
associating a data string output by the at least one trigger with the each of the plurality of controllers.

4. The computer-implemented method of selecting an optimal controller for transcoding of claim 3, wherein at least one of the at least one trigger outputs the priority value according to an algorithm comprising of at least one of a full matching algorithm, a partial matching algorithm, and a matching algorithm using a grep function.

5. A computer program product for use in conjunction with a computer system, the computer program product comprising a computer readable, non-transitory storage medium and a plurality of instructions, the plurality of instructions, when executed by a computer, cause the computer to perform the steps of:
selecting and loading at least one module according to at least one configuration parameter;
selecting and loading a plurality of controllers associated with the at least one module;
obtaining a plurality of controller priority values and a plurality of controller data strings, wherein each of the plurality of controller priority values is associated with one of the plurality of controllers, and wherein each of the plurality of controller data strings is associated with one of the plurality of controllers; and
selecting one of the plurality of controllers as the optimal controller, such that:
the priority value associated with the optimal controller is greater than or equal to the priority value associated with each of the other controllers; and
wherein selecting one of the plurality of controllers as the optimal controller is selected such that the data string associated with the optimal controller is one of: (1) longer than and (2) longer than or equal in length to each of the data strings associated with each of the other controllers associated with a priority value equal to the priority value associated with the optimal controller.

6. The computer program product for use in conjunction with a computer system of claim 5,
wherein the optimal controller is one of the plurality of controllers,
wherein the priority value associated with the optimal controller matches a default priority value.

7. The computer program product for use in conjunction with a computer system of claim 5, wherein obtaining a plurality of controller priority values and a plurality of controller data strings comprises:
defining at least one trigger associated with each of the plurality of controllers,
looping non-transcoded data through the at least one trigger,
associating a priority value output by the at least one trigger with the each of the plurality of controllers, and
associating a data string output by the at least one trigger with the each of the plurality of controllers.

8. The computer program product for use in conjunction with a computer system of claim 7, wherein at least one of the at least one trigger outputs the priority value according to an algorithm comprising of at least one of a full matching algorithm, a partial matching algorithm, and a matching algorithm using a grep function.

9. A computer-implemented transcoding method implemented on a website server, comprising:
handling a request;
selecting an optimal controller;
generating a response; and
returning the response comprising at least one header of the response and at least one body of the response,
wherein selecting an optimal controller comprises:
selecting and loading at least one module according to at least one configuration parameter;
selecting and loading a plurality of controllers associated with the at least one module;
obtaining a plurality of controller priority values and a plurality of controller data strings, wherein each of the plurality of controller priority values is associated with one of the plurality of controllers, and wherein each of the plurality of controller data strings is associated with one of the plurality of controllers; and
selecting one of the plurality of controllers as the optimal controller, such that:
the priority value associated with the optimal controller is greater than or equal to the priority value associated with each of the other controllers; and
the data string associated with the optimal controller is one of longer than and longer than or equal in length to each of the data strings associated with each of the other controllers associated with a priority value equal to the priority value associated with the optimal controller.

10. The computer-implemented transcoding method of claim 9, wherein handling a request comprises:
accepting a request to transcode a webpage;
selecting and loading at least one configuration parameter;
performing a server load check;
one of initializing and restoring a user session; and
checking for a cached response on the server, and returning the cached response as a response if the cached response is found.

11. The computer-implemented transcoding method of claim 9,
wherein the optimal controller is one of the plurality of controllers,
wherein the priority value associated with the optimal controller matches a default priority value.

12. The computer-implemented transcoding method of claim 9, wherein obtaining a plurality of controller priority values and a plurality of controller data strings comprises:
defining at least one trigger associated with each of the plurality of controllers, looping non-transcoded data through the at least one trigger, associating a priority value output by the at least one trigger with the each of the plurality of controllers, and associating a data string output by the at least one trigger with the each of the plurality of controllers.

13. The computer-implemented transcoding method of claim 9, wherein generating a response comprises:

selecting and loading a template associated with the optimal controller, wherein the template includes at least one placeholder associated with at least one key;

generating one of the at least one header of the response;

querying a non-transcoded webpage and obtaining at least one query response;

loading the at least one query response into a DOM object;

setting the at least one key according to the DOM object;

removing placeholders associated with unset keys; and generating one of the at least one body of the response according to the at least one key and the template, wherein the one of the at least one header of the response and the one of the at least one body of the response comprise web-compatible language.

14. The computer-implemented transcoding method of claim 13, wherein the one of the at least one header of the response comprises at least one of HTML header language and XML header language.

15. The computer-implemented transcoding method of claim 13, wherein the one of the at least one body of the response comprises at least one of HTML content, XML content, image content, scripting content, and CSS content.

16. The computer-implemented transcoding method of claim 9, wherein returning the response comprises:

determining if caching the response is possible;

caching the response if caching is possible; and returning the one of the at least one header of the response and the one of the at least one body of the response.

17. The computer-implemented transcoding method of claim 16, wherein returning the response further comprises:

optimizing the response if global configuration settings allow for optimizing the response.

18. The computer-implemented transcoding method of claim 17, wherein optimizing the response comprises at least one of optimizing scripting and CSS code, modifying at least one URL to point to at least one desired webpage, and removing white space.

* * * * *